(12) United States Patent
Ishida et al.

(10) Patent No.: US 8,204,663 B2
(45) Date of Patent: Jun. 19, 2012

(54) VEHICLE CONTROL APPARATUS

(75) Inventors: Yasuhito Ishida, Toyokawa (JP); Gen Inoue, Susono (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 957 days.

(21) Appl. No.: 12/204,380

(22) Filed: Sep. 4, 2008

(65) Prior Publication Data

US 2009/0069996 A1 Mar. 12, 2009

(30) Foreign Application Priority Data

Sep. 6, 2007 (JP) ................................. 2007-231276

(51) Int. Cl.
*G06F 19/00* (2011.01)

(52) U.S. Cl. ................. 701/70; 701/74; 701/78; 701/93; 701/94; 701/96; 303/155; 303/156; 303/166; 303/167; 303/168

(58) Field of Classification Search .................... 701/70, 701/74, 78, 93, 94, 96; 303/155, 156, 166, 303/167, 168
See application file for complete search history.

(56) References Cited

U.S. PATENT DOCUMENTS

| | | | | |
|---|---|---|---|---|
| 5,612,879 A | * | 3/1997 | Makino | ............................ 701/70 |
| 5,819,193 A | | 10/1998 | Burgdorf et al. | |
| 6,196,644 B1 | * | 3/2001 | Sager | ............................ 303/195 |
| 7,739,023 B2 | * | 6/2010 | Lee | ................. 701/96 |
| 7,996,139 B2 | * | 8/2011 | Okuda et al. | .................... 701/93 |
| 2004/0215385 A1 | | 10/2004 | Aizawa et al. | |
| 2008/0154472 A1 | * | 6/2008 | Okuda et al. | .................... 701/93 |

FOREIGN PATENT DOCUMENTS

| | | |
|---|---|---|
| DE | 43 14 449 A1 | 11/1994 |
| JP | 7-257352 A | 10/1995 |
| JP | 2004-090679 A | 3/2004 |

* cited by examiner

*Primary Examiner* — Joanne Silbermann
*Assistant Examiner* — Marlon Arce
(74) *Attorney, Agent, or Firm* — Buchanan Ingersoll & Rooney PC

(57) ABSTRACT

A vehicle control apparatus controlling a driving force or a braking force to be applied to a vehicle and conducting a vehicle control based on wheel speeds includes a detecting means detecting the wheel speed of each wheel provided at the vehicle, a storing means storing a predetermined valid wheel speed for each wheel, a determining means determining whether a difference between the detected wheel speed and a maximum wheel speed of the wheel speeds lies in a predetermined range, and an updating means updating the valid wheel speed based on the detected wheel speed of the wheel, when the detected wheel speed is lower than the predetermined valid wheel speed which is currently stored, in case that a result determined by the determining means is positive.

11 Claims, 4 Drawing Sheets

VEHICLE CONTROL APPARATUS

CROSS REFERENCED TO RELATED APPLICATIONS

This application is based on and claims priority under 35 U.S.C §119 with respect to Japanese Patent Application 2007-231276, filed on Sep. 6, 2007, the entire content of which is incorporated therein by reference.

FIELD OF THE INVENTION

The invention relates to a technology which accurately estimates a lowest value of a wheel speed for preventing control malfunction of a vehicle control apparatus such as an anti-lock braking system (ABS), a traction control system (TRC), and a rear wheel steering unit (4WS).

BACKGROUND

In these kinds of vehicle control apparatus, validity of each wheel speed, which is used to calculate a vehicle speed, should be assured for properly performing a vehicle control based on the vehicle speed. Especially, during low speed running, an output of a wheel speed sensor could be below a speed which is detectable by the wheel speed sensor, leading to unreliable detection values. Therefore, a minimum calculable value of the wheel speed, i.e. a valid wheel speed, should be set to a threshold value to accurately determine the validity of the wheel speed.

In JP H7-257352A, a vehicle control unit is disclosed. A minimum calculable value of a wheel speed or an allowable speed, at which the vehicle control is allowed to be conducted, whichever is greater, is set to a selected value. Then, the vehicle control unit compares the selected value and the vehicle speed to determine whether or not the vehicle control should be conducted.

However, in the vehicle control unit disclosed in JP H7-257352A, the wheel speed, which is first calculated after the vehicle starts running, is set as the minimum calculable value. In such a case, the minimum calculable value may not be accurately calculated in the following situations due to influences caused therein. For example, in case that the vehicle is accelerated rapidly from a standstill, in case that noise occurs in at output of the wheel speed sensor, or in case that filtering is performed in the wheel speed calculation, the minimum calculable value may not be accurately calculated. This drawback is observed prominently when constant speed control is conducted at a low speed as disclosed in JP 2004-90679A.

The present invention is made in view of the drawbacks described above and provides a vehicle control apparatus which accurately calculates a minimum calculable value of a wheel speed, i.e. a valid wheel speed, to prevent control malfunction even in the above-described situations.

SUMMARY OF THE INVENTION

According to an aspect of the present invention, a vehicle control apparatus controlling a driving force or a braking force to be applied to a vehicle and conducting a vehicle control based on wheel speeds includes a detecting means detecting the wheel speed of each wheel provided at the vehicle, a storing means storing a predetermined valid wheel speed for each wheel, a determining means determining whether a difference between the detected wheel speed and a maximum wheel speed of the wheel speeds lies in a predetermined range, and an updating means updating the valid wheel speed based on the detected wheel speed of the wheel, when the detected wheel speed is lower than the predetermined valid wheel speed which is currently stored, in case that a result determined by the determining means is positive.

According to another aspect of the present invention, a vehicle control method for controlling a driving force or a braking force to be applied to a vehicle and conducting a vehicle control based on wheel speeds includes the steps of detecting the wheel speed of each wheel provided at the vehicle, storing a predetermined valid wheel speed for each wheel, determining whether a difference between the detected wheel speed and a maximum wheel speed of the wheel speeds lies in a predetermined range, and updating the valid wheel speed based on the detected wheel speed of the wheel, when the detected wheel speed is lower than the predetermined valid wheel speed which is currently stored, in case that a result determined by the determining means is positive.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

The operation and profits of the invention will be described with reference to an embodiment described below.

Hereinafter, the embodiment, which is a best mode to implement the invention, will be described in details with reference to drawings.

(1) Structure

Firstly, referring to a schematic plain view shown in FIG. 1, a specific example of a vehicle 10 including a vehicle control apparatus according to the embodiment of the invention will be described.

Figure 1:
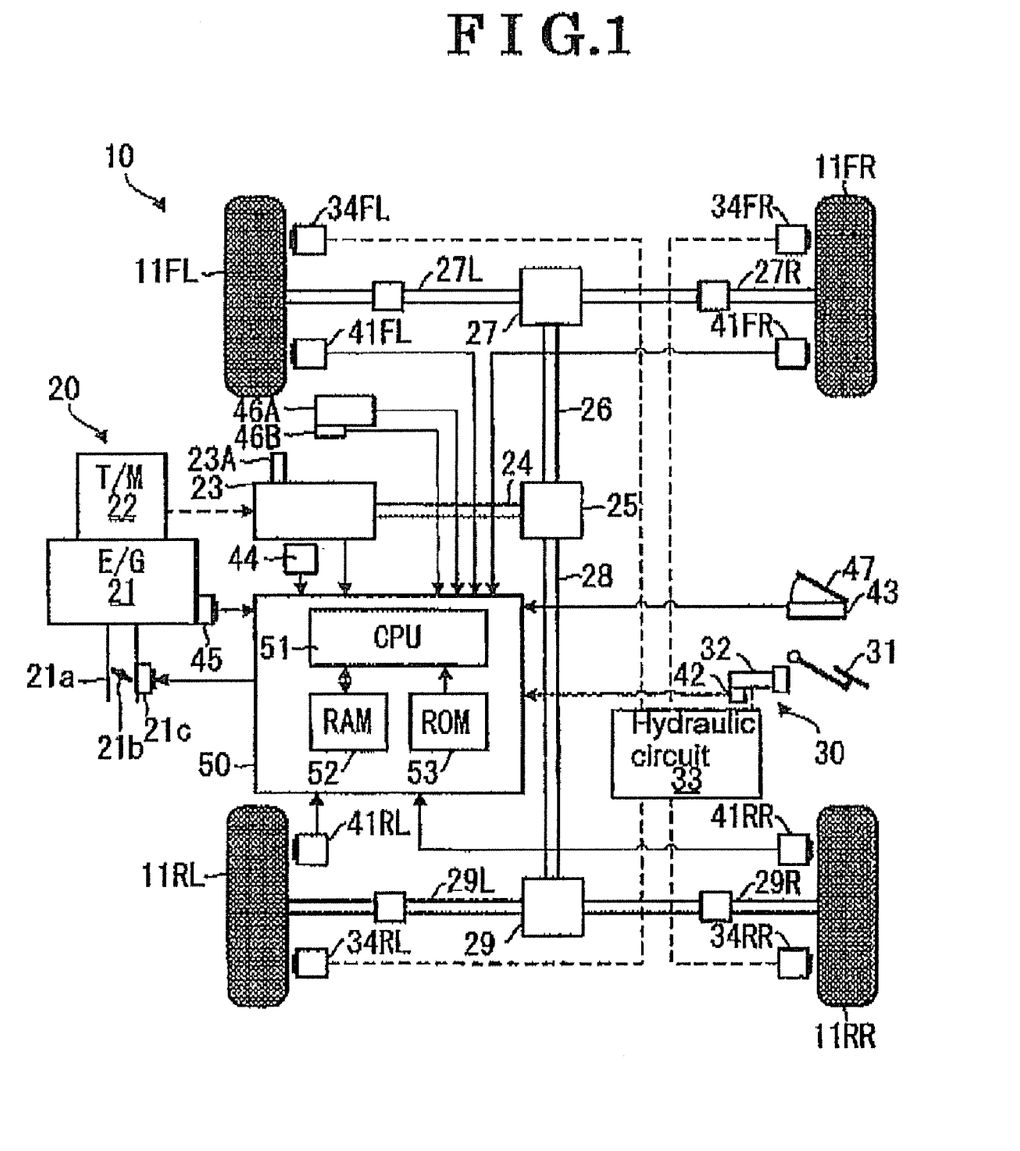
FIG. 1 is a plain view schematically showing a vehicle including a vehicle control apparatus according to an embodiment of the invention.

In FIG. 1, the vehicle 10 is a four wheel drive vehicle, and is provided with a front right wheel 11FR, a front left wheel 11FL, a rear light wheel 11RR and a rear left wheel 11RL. The vehicle 10 is further provided with a driving mechanism 20 and a brake mechanism 30.

The driving mechanism 20 is provided with an engine 21 serving as a driving source of the vehicle 10, a transmission 22, a transfer 23, an output shaft 24 and a center differential 25.

The engine 21 is a known spark ignited internal combustion engine equipped with an electronic fuel injector (not shown). The engine 21 is provided with an intake pipe 21a comprising an intake passage, a throttle valve 21b, and a throttle valve actuator 21c.

The throttle valve 21b is rotatably supported at the intake pipe 21a. The rotational angle, i.e. an opening of the throttle valve 21b is changed. In association with the change of the rotational angle, the sectional area of the opening of the throttle valve 21b is changed to change the output torque generated by the engine 21. The throttle valve actuator 21c changes the rotation angle of the throttle valve 21b in response to a driving signal, i.e. an instruction signal.

The transmission 22 is provided with a known gear mechanism. The transmission 22 achieves a predetermined gear range depending on an operating state of the vehicle 10.

The transfer 23 includes a sub-transmission equipped with a known gear mechanism. The transfer 23 transmits power in either one of two transmitting states, which a driver may switch by operating an operating lever 23A. In one transmitting state, the power is transmitted in accordance with a high-speed gear ratio (hereinafter, referred to as H range state). In the other transmitting state, the power is transmitted in accordance with a low-speed gear ratio (hereinafter, referred to as L range state). Further, the transfer 23 outputs a signal, indicating whether the operating lever 23A is in the H position or in the L position, to an electronic control unit 50 which will be described below.

The configuration described above allows the output torque of the engine 21 (a force generated by the driving source) to be converted in accordance with a predetermined gear ratio determined by the states of the transmission 22 and the transfer 23. The output shaft 24 transmits the converted torque to the center differential 25.

Further, the driving mechanism 20 is provided with a front propeller shaft 26, a front differential 27, a drive shaft for the front right wheel 27R, and a drive shaft for the front left wheel 27L. The front propeller shaft 26 transmits the torque, transmitted to the center differential 25 via the output shaft 24 and is output from the center differential 25, to the front differential 27. The front differential 27 transmits the torque, transmitted via the front propeller shaft 26, to the drive shaft for the front right wheel 27R and the drive shaft for the front left wheel 27L. The drive shaft for the front right wheel 27R rotates the front right wheel 11FR by using the torque transmitted from the front differential 27. Similarly, the drive shaft for the front left wheel 27L rotates the front left wheel 11FL by using the torque transmitted from the front differential 27.

Additionally, the driving mechanism 20 is provided with a rear propeller shaft 28, a rear differential 29, a drive shaft for the rear right wheel 29R, and a drive shaft for the rear left wheel 29L. The rear propeller shaft 28 transmits the torque, output from the center differential 25, to the rear differential 29. The rear differential 29 transmits the torque, transmitted via the rear propeller shaft 28, to the drive shaft for the rear right wheel 29R and the drive shaft for the rear left wheel 29L. The drive shaft for the rear right wheel 29R rotates the rear right wheel 11RR by using the torque transmitted from the rear differential 29. Similarly, the drive shaft for the rear left wheel 29L rotates the rear left wheel 11RL by using the torque transmitted from the rear differential 29.

The above-described configuration allows the output torque of the engine 21 to be converted to a driving force for rotating the front right wheel 11FR, the front left wheel 11FL, the rear right wheel 11RR, and the rear left wheel 11RL.

The brake mechanism 30 is provided with a brake pedal 31, a master cylinder 32, a hydraulic circuit 33, and wheel cylinders 34FR, 34FL, 34RR, and 34RL.

A known configuration may be adapted for the master cylinder 32. The master cylinder 32 increases and decreases a hydraulic pressure of control oil (master cylinder pressure), which is transmitted to the hydraulic circuit 33 depending on an operation amount of the brake pedal 31.

The hydraulic circuit 33 is provided with a reservoir, an oil pump, and various valve mechanisms which are not shown. The hydraulic circuit 33 generates a tentative hydraulic brake pressure to be applied to the wheel cylinders 34FR, 34FL, 34RR, and 34RL in response to a signal from the electronic control unit 50, which will be described later. Then, the hydraulic circuit 33 sets either one of the master cylinder pressure and the tentative hydraulic brake pressure to a final hydraulic brake pressure based on the signal from the electronic control unit 50 and applies the final hydraulic brake pressure to the wheel cylinders 34FR, 34FL, 34RR, and 34RL.

The wheel cylinders 34FR, 34FL, 34RR, and 34RL are respectively installed at the front right wheel 11FR, the front left wheel 11FL, the rear right wheel 11RR, and the rear left wheel 11RL. Each wheel cylinder 34FR, 34FL, 34RR, and 34RL generates the wheel braking force for decreasing the rotational speed of a rotor, unitarily rotating with the corresponding wheel 11FR, 11FL, 11RR, and 11RL, based on the hydraulic brake pressure applied by the hydraulic circuit 33.

The above-described configuration allows the master cylinder pressure or the pressure of the control oil adjusted by the hydraulic circuit 33 to be converted into the braking force to decrease the rotational speeds of the front right wheel 11FR, the front left wheel 11FL, tile rear right wheel 11RR, and the rear left wheel 11RL.

Meanwhile, a vehicle braking force is a resultant of the forces applied to each wheel to decrease the rotational speed of each wheel, i.e. a force applied to the vehicle, and is a reversing force to the vehicle driving force, which drives the vehicle 10 in a traveling direction. Hereinafter, a force applied to the individual wheels is referred to as the wheel braking force, and a force applied to the vehicle is referred to as the vehicle braking force.

The electronic control unit 50 is respectively connected with wheel speed sensors 41FR, 41FL, 41RR, and 41RL, a pressure sensor 42, an accelerator operation amount sensor 43, an inclination sensor 44, an engine rotational speed sensor 45, a constant speed running control switch 46A, and a target vehicle speed selector 46B.

The wheel speed sensors 41FR, 41FL, 41RR, and 41RL respectively detect a wheel speed VWFR of the front right wheel 11FR, a wheel speed VWFL of the front right wheel 11FL, a wheel speed VWRR of the rear right wheel 11RR, and a wheel speed VWRL of the rear left wheel 11RL and output the detection information to the electronic control unit 50 as signals.

The pressure sensor 42 detects a master cylinder pressure Pm and outputs the detection information to the electronic control unit 50 as a signal.

The accelerator operation amount sensor 43 detects an operation amount of an accelerator pedal 47 Ap and outputs the detection information to the electronic control unit 50 as a signal.

The inclination sensor 44 outputs a signal (hereinafter, referred as to inclination G) indicating an inclination angle of the vehicle. When the value of the inclination G is 0, the vehicle is horizontally placed. When the value is a positive value, a front of the vehicle is placed higher than a rear thereof.

The engine rotational speed sensor 45 detects a rotational signal NE of the engine 21 and outputs the detection information to the electronic control unit 50 as a signal.

The constant speed running control switch 46A outputs a signal indicating the state selected by the driver, i.e. an on state or an off state, to the electronic control unit 50. The target vehicle speed selector 46B outputs a signal indicating a position of the target vehicle speed selector 46B selected by the driver, i.e. Hi, Mid, and Lo, to the electronic control unit 50. The signal indicating the position of the target vehicle speed selector 46B is used for setting the target vehicle speed.

The electronic control unit 50 is comprised of a known micro computer including a CPU (Central Processing Unit) 51, a RAM (Random Access Memory) 52, a ROM (Read-Only Memory) 53 and an input-output port. The input-output port is electrically connected with the above-described sensors 41 to 45, the constant speed running control switch 46A, the target vehicle speed selector 46B, the throttle valve actuator 21c, and the hydraulic circuit 33 of the brake mechanism 30. The input-output port supplies signals from the above-described sensors 41 to 45, the constant speed running control switch 46A, and the target vehicle speed selector 46B to the CPU 51. On the other hand, the input-output port outputs a driving signal to the throttle valve actuator 21c depending on the calculation result of the CPU 51 and outputs a braking signal to the hydraulic circuit 33.

In FIG. 1, the CPU 51 is one example of a determining means, an updating means, a filtering means, and an accelerating detecting means. The wheel speed sensors 41FR, 41FL, 41RR, and 41RL are one example of a detecting means of the invention, and the RAM52 is one example of a storing means.

(2) Operation

Next, referring to a flowchart of FIG. 2, an updating process of a valid wheel speed VWV preformed by the vehicle control apparatus according to the embodiment will be described. Here,  represents a wheel subject to the updating process from among the front right wheel 11FR, the front left wheel 11FL, the rear right wheel 11RR, and the rear left wheel 11RL. For example, the valid wheel speed VWV** indicates a valid wheel speed of the wheel subject to the updating process, i.e. a speed at which the validity of the output value of the wheel speed sensor is assured. Typically, the updating process is performed to the individual wheels.

Figure 2:
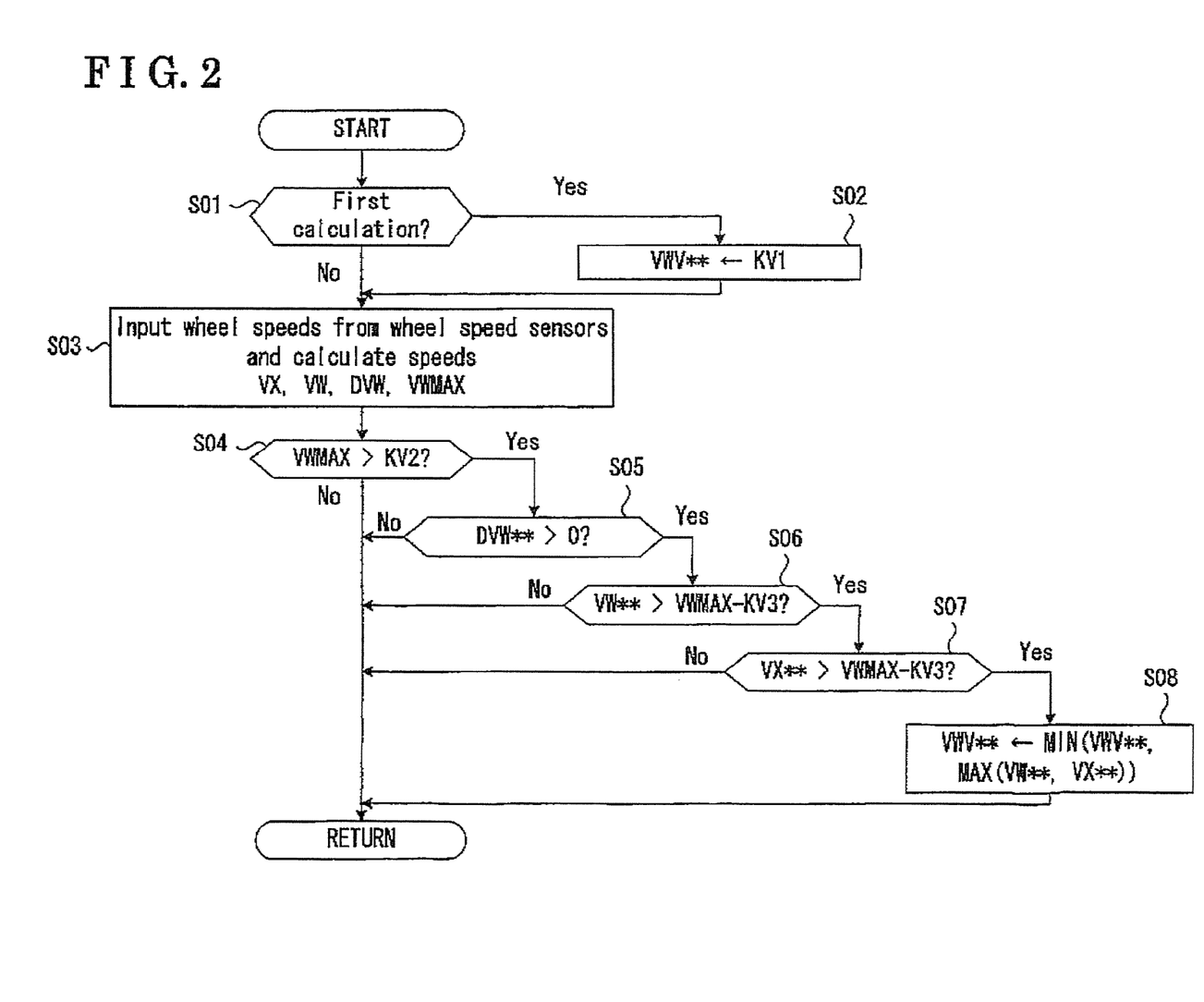
FIG. 2 is a flowchart showing an updating process of a valid wheel speed VWV** performed by the vehicle control apparatus according to the embodiment.

In FIG. 2, a check is conducted to determine whether the calculation of the valid wheel speed VWV is a first calculation (Step S01). Here, if the calculation of the valid wheel speed VWV is the first calculation (Step S01: Yes), an initial value KV1 of the valid wheel speed VWV is assigned to the valid wheel speed VWV (Step S02). Here, the initial value KV1 represents a minimum wheel speed at which each wheel speed sensor 41** assures the validity.

On the other hand, if the calculation of the valid wheel speed VWV is not the first calculation, the initial value KV1 or an updated wheel speed has been stored in the valid wheel speed VWV (Step S01: No).

Next, the wheel speeds are input from each wheel speed sensor 41FR, 41FL, 41RR, and 41RL to the electronic control unit 50. The wheel speed of each wheel (the value before the filtering) VX, the wheel speed (the value after the filtering) VW and a wheel acceleration DVW are respectively calculated based on the wheel speeds input to the electronic control unit 50. The wheel speed (the value before the filtering) VX is an output of each wheel speed sensor. The wheel speed (the value after the filtering) VW is an output of each wheel speed sensor on which the filtering is performed for removing noise.

The wheel acceleration DVW is obtained by differentiating the wheel speed (the value after the filtering) over time. Further, the highest wheel speed of all calculated wheel speeds (the value after the filtering) VW is assigned to VWMAX (Step S03).

Determinations described below will be made based on these calculated values (Steps S04 to S07). When all conditions for the determinations are fulfilled, the valid wheel speed VWV** is updated to a new value.

First, a check is made to determine whether the following inequality is true or not (Step S04).

$$VWMAX > KV2$$

Namely, a check is made to determine whether or not the vehicle 10 is running at a higher speed than a calculation allowable speed KV2. If the vehicle 10 is running at a speed lower than the calculation allowable speed KV2, the wheel speed VW may be out of a detectable range of the wheel speed sensor 41**. For this reason, the updating process is not performed in such a case. The calculation allowable speed KV2 represents a speed at which the calculation is allowed to be conducted. The calculation allowable speed KV2 is determined as a threshold value by experiments or simulations and corresponds to a lower limit of a speed of the vehicle 10**, which is requested for performing the updating process in a desirable manner. The calculation allowable speed KV2 may be a fixed value or a variable which is changed based on feedbacks provided from the result determined using the value of KV2.

If VWMAX>KV2 is not tire (Step S04: No), for example when the vehicle is parked, the updating process is terminated for the reason stated above. Then, after a predetermined time is elapsed, the updating process is restarted (RETURN). On the other hand, if VWMAX>KV2 is true (Step S04: Yes), further determinations will be made.

Next, a check is made to determine whether or not the following inequality is true (Step S05).

$$DVW** > 0[G]$$

Namely, a check is made to determine whether or not the wheel subject to the updating process 11 is accelerating. When the wheel 11** is decelerating, the wheel speed VW may fall outside the detectable range of the wheel speed sensor 41 during the updating process. Hence, the updating process is not performed in such a case. Meanwhile, the acceleration determination is made by comparing the DVW with 0 [G], and may be made by comparing the DVW** with a predetermined value larger than 0 [G].

Here, when DVW>0[G] is not true (Step S05: No), the updating process is terminated for the reason stated above. Then, after a predetermined time is elapsed, the updating process is restarted (RETURN). On the other hand, when DVW>0 [G] is true (Step S05: Yes), further determinations will be made.

Next, a check is made to determine whether or not the following inequality is true (Step S06).

$$VW** > VWMAX - KV3$$

That is, a check is made to determine whether or not the wheel speed (after the filtering) VW of the wheel 11** subject to the updating process lies within a predetermined valid speed determining threshold KV3 from the highest wheel speed VWMAX. If the wheel speed (after the filtering) VW of the wheel 11 does not lie within the valid speed determining threshold KV3, variations in the wheel speeds after the filtering VW are not in an allowable range in terms of calculation accuracy. Thus, the updating process is not performed in such a case. Meanwhile, the valid speed determining threshold KV3 is a threshold predetermined by experiments or simulations and serves as an allowable range of the variations in the wheel speeds (after the filtering) VW**. The valid speed determining threshold KV3 may be a fixed value or a variable which is changed based on the feedbacks of the determination made depending on the value.

Here, if VW**>VWMAX−KV3 is not true (Step S06: No), the updating process is terminated for the reason stated above. Then, after a predetermined time is elapsed, the updating process is restarted (RETURN). On the other hand, the inequality is true (Step S06: Yes), further determinations will be made.

Next, a check is made to determine whether the following inequality is true or not (Step S07). VX>VWMAX−KV3 That is, as with the wheel speed (after the filtering) VW, a check is made to determine whether or not a difference between the highest wheel speed VWMAX and the wheel speed (before the filtering) VX of the wheel 11 subject to the updating process lies in the predetermined valid speed determining threshold KV3. If the wheel speed (before the filtering) VX does not lie within the predetermined valid speed determining threshold KV3 front the highest wheel speed VWMAX when the wheel speed (after the filtering) VW lies within the predetermined valid speed determining threshold KV3 the highest wheel speed VWMAX, the wheel speed significantly varies before and after the filtering. In other words, noise occurs in the output of the wheel speed sensor 41**. Thus, the updating process is not performed in such a case.

Here, if VX**>VWMAX−KV3 is not true (Step S07: No), the updating process is terminated for the reason stated above. Then, after a predetermined time is elapsed, the updating process is restarted (RETURN).

On the other hand, if VX>VWMAX−KV3 is true (Step S07: Yes), the output of the wheel speed sensor 41 is considered reliable enough for performing the updating process. Then, the value of the valid wheel speed VWV is updated to "MIN (VWV, MAX (VW,VX))" in accordance with the output of the wheel speed sensor 41 (Step S08). More specifically, the wheel speed (after the filtering) VW or the wheel speed before the filtering) VX, whichever is greater, is selected. If the selected wheel speed is smaller than the valid wheel speed VWV currently stored, the current valid wheel speed VWV** is updated with the selected wheel speed.

The above-described processes allow the valid wheel speed VWV to be selectively updated only if the vehicle 10 is running in a suitable state. The vehicle control apparatus repetitively performs the updating process (RETURN), thereby gradually lowering the valid wheel speed VWV. Eventually, the minimum detectable wheel speed is accurately detected.

Figure 3:
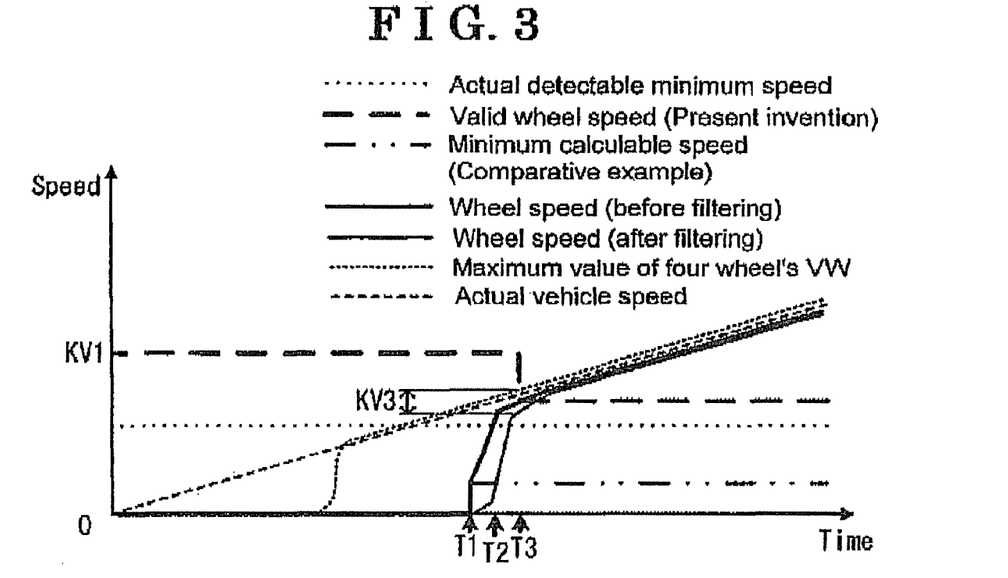
FIG. 3 is a time chart showing the updating process of the valid wheel speed VWV** performed by the vehicle control apparatus according to the embodiment when an error of an initial calculation is large.
Figure 4:
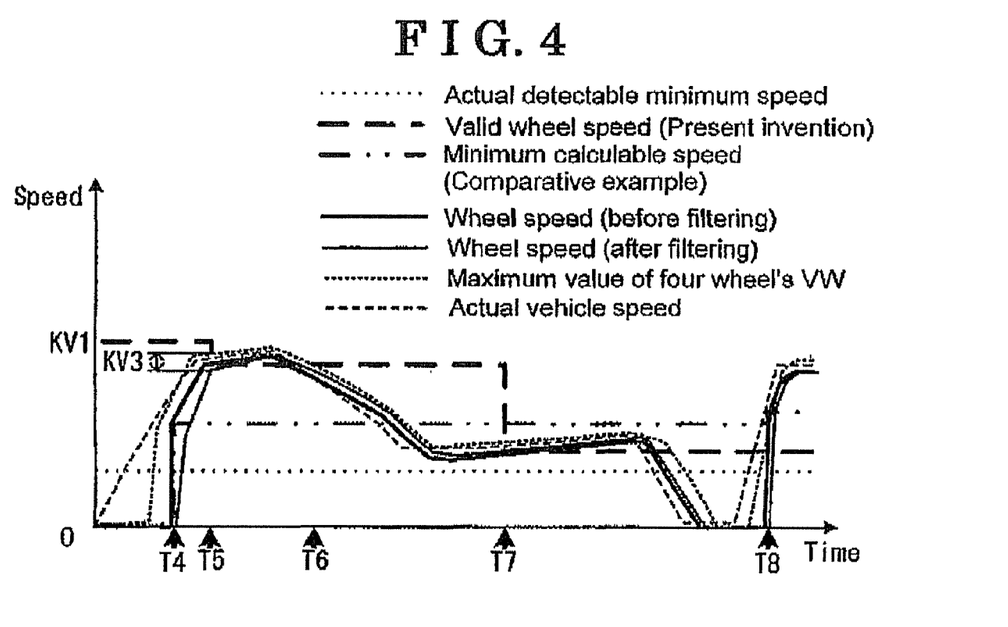
FIG. 4 is a time chart showing the updating process of the valid wheel speed VWV performed by the vehicle control apparatus according to the embodiment when the vehicle rapidly accelerates, stops, and rapidly accelerates.
Figure 5:
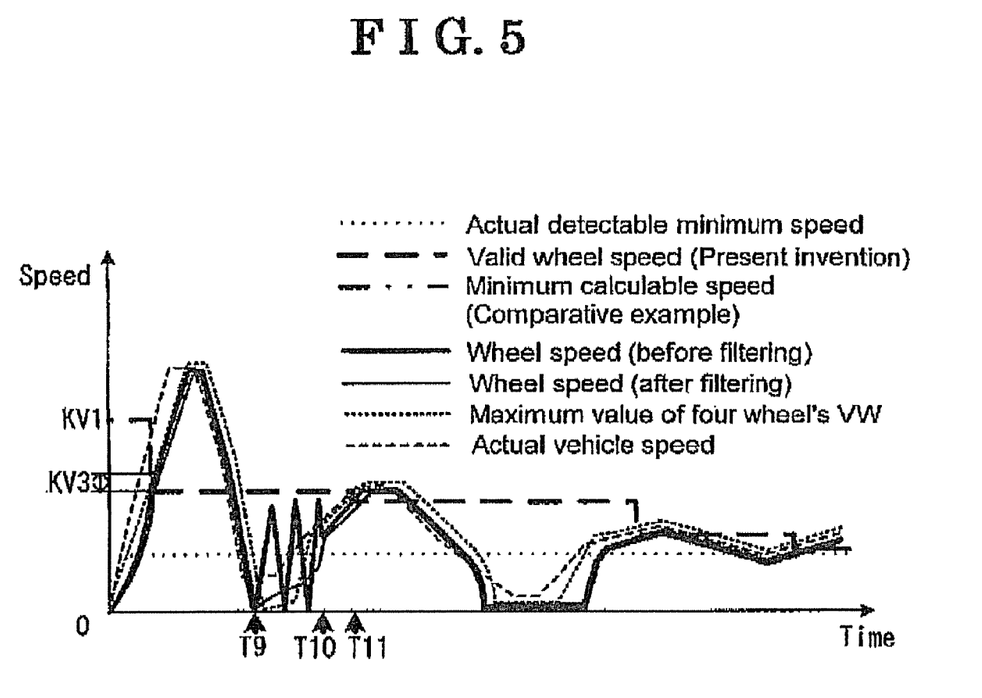
FIG. 5 is a time chart showing the updating process of the valid wheel speed VWV performed by the vehicle control apparatus according to the embodiment when noise occurs in a detection value of the wheel speed before filtering.

Following the aforementioned flowchart, the valid wheel speed VWV** is updated as shown in FIGS. 3 to 5.

First, referring to a time chart of FIG. 3, the updating process of the valid wheel speed VWV** performed by the vehicle control apparatus according to the embodiment will be described. Here, a case that initial calculation error is large will be described.

In FIG. 3, a vertical axis represents speed and a horizontal axis represents time. The time chart shows variations of an actual detectable minimum speed VWVR of the wheel speed sensor 41**, a valid wheel speed (of the invention) VWV, a minimum calculable speed (of the comparative example) VM, a wheel speed (before the filtering) VX, a wheel speed (after the filtering) VW, a maximum value of four wheel's VW VWMAX, and an actual vehicle speed VR.

In FIG. 3, during a time period from 0 to T1, the actual vehicle speed VR is extremely small and not detectable by the wheel speed sensor 41**. Thus, the wheel speed (before the filtering) VX remains 0. Then, the actual vehicle speed is gradually increased from 0, and the calculations start for determining the wheel speed (before the filtering) VX and the wheel speed (after the filtering) VW at time T1.

At this time, in the comparative example, the value of the wheel speed before the filtering VX, which is first calculated after the vehicle 10 starts running, is set to the minimum calculable speed VM (for example, refer to JP H7-257352A). Then, the minimum calculable speed VM could be set to a value lower than the actual detectable minimum speed VWVR. Hence, the vehicle speed, which is not actually calculable, or an unreliable calculation result could be used for the vehicle control.

On the other hand, in the embodiment, an initial value of the valid wheel speed (of the invention) is pre-defined to KV1, which is higher than the actual detectable minimum speed VWVR (refer to Step S02 of FIG. 2), and the valid wheel speed (of the invention) VWV is gradually lowered to be close to the actual detectable minimum speed VWVR. Here, at time T1, since the difference between the wheel speed (before the filtering) VX and the maximum value of the four wheel's VW VWMAX is larger than KV3, the valid wheel speed (of the intention) VWV is not updated considering the variances in the wheel speeds (refer to Step S06 of FIG. 2). At time T2, the difference between the wheel speed (before the filtering) VX and the maximum value of the four wheel's VW VWMAX becomes smaller than KV3, however, the difference between the wheel speed (after the filtering) VW and the maximum value of the four wheel's VW VWMAX is still larger than KV3. Thus, the valid wheel speed (of the invention) VWV is not updated considering the variations in the wheel speeds after and before the filtering (refer to Step S07 of FIG. 2). At time T3, the difference between the maximum value of the flout wheel's VW VWMAX and the wheel speed before the filtering VX and the difference between the maximum value of the four wheel's VW VWMAX and the wheel speed after the filtering VW become smaller than KV3. Thus, the valid wheel speed VWV is updated based on the wheel speed calculated at this moment (refer to Step S08 of FIG. 2). Thus, even if the vehicle is rapidly accelerated, the updating process is performed in a stable state in which the variances in the wheel speeds and the difference between the wheel speeds before and after the filtering are in the allowable range. Therefore, the valid wheel speed VWV** is accurately calculated.

Next, referring to a time chart of FIG. 4, the updating process of the valid wheel speed VWV** performed by the vehicle control apparatus according to the embodiment will be described. Here, a case that the vehicle is rapidly accelerated, stopped and rapidly accelerated again will be described.

As shown in FIG. 4, the vehicle 10 is rapidly accelerated from time 0. Here, according to the embodiment, in contrast to the comparative example, the valid wheel speed VWV is not updated at time T4 as described in FIG. 3. At time T5, the difference between the maximum value of the four wheel's VW VWMAX and the wheel speed before the filtering VX and the difference between the maximum value of the four wheel's VW VWMAX and the wheel speed after the filtering VW become smaller than KV3. Thereafter, the valid wheel speed VWV is updated (refer to Steps S06 and S07 of FIG. 2). At time T6, although the difference between the maximum value of the four wheel's VW VWMAX and the wheel speed before the filtering VX and the difference between the maximum value of the four wheel's VW VWMAX and the wheel speed after the filtering VW are still smaller than KV3, the vehicle is decelerated, the valid wheel speed VWV is not updated (refer to Step S05 of FIG. 2). On the other hand, at time T7, the vehicle is being accelerated, the valid wheel speed VWV could be updated. Then, until time T8, the vehicle 10 is decelerated, stopped and rapidly accelerated again. During this period, it is assumed that the variations in the wheel speeds are relatively large. Hence, the valid wheel speed VWV is not updated. As just described, the updating process is appropriately performed following the flowchart of FIG. 2, and these processes allow the valid wheel speed VWV to approximate the actual detectable minimum speed VWVR with good accuracy.

Next, referring to a time chart of FIG. 5, the updating process of the valid wheel speed VWV** performed by the vehicle control apparatus according to the embodiment will be described. Here, a case that noise occurs in the detection value of the wheel speed before the filtering will be described.

As shown in FIG. 5, at time T9 to T10, noise occurs in the wheel speed (before the filtering) VX. Even thought the noise is removed by filtering, the wheel speed (after the filtering) VW may be away from the actual vehicle speed VR. Hence, the valid wheel speed VWV should not be updated at time T9 to T10. Meanwhile, when the noise occurs in the wheel speed, the calculated value of the wheel speed is likely to significantly vary before and after the filtering. Thus, in the embodiment, a check is made to determine if the difference between the maximum value of the four wheel's VW VWMAX and the wheel speed before the filtering VX and the difference between the maximum value of the four wheel's VW VWMAX and the wheel speed after the filtering VW are smaller than KV3 (refer to Step S06 and S07 of FIG. 2) and detect the occurrence of the noise. Thus, at time T9 to T10, updating the valid wheel speed VWV is avoided and then the valid wheel speed VWV** is accurately updated at time T11 at which the noise is not observed.

According to the embodiment described above, during the slow speed ruing of the vehicle 10, even where the vehicle 10 is accelerated rapidly, where the noise occurs in the output of the wheel speed sensor, or where the filtering of the wheel speed calculation is performed, the valid wheel speed VWV** can be calculated with relatively good accuracy. Accordingly, the vehicle control apparatus properly conducts the vehicle control based on the wheel speed accurately calculated during a low-speed running.

The invention is not limited to the aforementioned embodiment and may be appropriately modified without departing from the scope of the invention or the concept read from claims and the specification. Vehicle control apparatuses including such modifications are also in the technical scope of the invention.

For example, in Steps S06 and S07 of FIG. 2, instead of VWMAX, VW of another wheel may be used as the condition for the determination. Any wheel will do as far as the wheel is usable to determine whether the variances in the wheel speeds before the filtering VX among the wheels, the variances in the wheel speeds after the filtering VW among the wheels and the difference between the wheel speeds before and after the filtering lie in the predetermined range.

Further, when the unusual value is detected as the wheel speed, or an operational state of the wheel speed sensor is unstable due to a rough road, noise or the like, the updating process may be avoided.

Furthermore, in case that the updating process is performed when the state of the vehicle is unstable, the valid wheel speed VWV may be updated with a wrong value. For example, when the control such as ABS or TRC malfunctions, when the time period for the vehicle control is extremely long, or when the driving torque or the braking torque is extremely large in the constant speed control, especially in the low constant speed control, the valid wheel speed VWV may be updated with a wrong value. Thus, in such cases, the initial value KV1 may be set to the valid wheel speed to reset the updating process.

In order to resolve the afore-mentioned drawbacks, the vehicle control apparatus according to the embodiment controls the driving force or the braking force to be applied to the vehicle 10 so that the vehicle speed is maintained at the target speed. The vehicle control apparatus comprises the wheel speed sensors 41FR, 41FL, 41RR, 41RL detecting the wheel speeds of the wheels 11FR, 11FL, 11RR, 11RL provided at the vehicle 10, the RAM 52 storing the predetermined valid wheel speed VWV for each wheel 11FR, 11FL, 11RR, 11RL, the CPU 51 determining whether the difference between the detected wheel speed and the maximum wheel speed VWMAX of the wheels 11FR, 11FL, 11RR, 11RL lies in the predetermined range and updating the valid wheel speed VWV based on the detected wheel speed of the wheel 11FR, 11FL, 11RR, 11RL, when the detected wheel speed is lower than the predetermined valid wheel speed VWV** which is currently stored, in case that a result determined by the CPU 51 is positive.

In the vehicle control apparatus according to the embodiments a driving force and a braking force to be applied to the vehicle 10 are controlled so that the vehicle speed is maintained at the target speed, which is calculated based on operation information such as various sensor information, vehicle information, driver's operation information. In order to conduct the vehicle control properly, the validity of the wheel speeds, which is used to calculate the vehicle speed, should be assured. Especially, during the low speed running, the output of the wheel speed sensor 41FR, 41FL, 41RR, 41RL could fall below the detectable speed, leading to the unreliable detection value. Therefore, the valid wheel speed VWV** should be set to the threshold value for accurately determining the validity of the wheel speed.

First, the wheel speed sensors 41FR, 41FL, 41RR, 41RL detect the wheel speeds of the individual wheels 11FR, 11FL, 11RR, 11RL provided at the vehicle 10. Here, the wheel speed sensors 41FR, 41FL, 41RR, 41RL detect each wheel speed based on a frequency of the signal varying depending on the rotation of the wheel 11FR, 11FL, 11RR, 11RL. Although the wheel speed sensors 41FR, 41FL, 41RR, 41RL may be provided at all wheels 11FR, 11FL, 11RR, 11RL in a four-wheel vehicle, this is not mandatory. Considering that the difference between the detected wheel speed and the maximum wheel speed of the wheels VWMAX is checked for the determination, at least two wheel speed sensors 41FR, 41FL, 41RR, 41RL need to be installed.

The RAM 52 stores the predetermined valid wheel speed VWV of the individual wheel 11FR, 11FL, 11RR, 11RL. Here, the RAM 52 is the Random Access Memory (RAM) provided at the electronic control unit 50 of the vehicle 10. The valid wheel speed VWV is a minimum wheel speed at which the wheel speed sensor 41FR, 41FL, 41RR, 41RL is able to detect. Namely, the detected wheel speed is considered invalid unless exceeding the valid wheel speed VWV. In other words, the wheel speed is unreliable unless exceeding the valid wheel speed VWV. The initial value KV1 of the valid wheel speed VWV is set at a vehicle manufacturing plant as the minimum wheel speed at which the wheel speed sensor 41FR, 41FL, 41R, 41RL assures the validity. For example, the initial value KV1 may be set to 3 km/h. The initial value KV1 of the valid wheel speed VWV is an estimate value and tends to be larger than the actual valid wheel speed VWV. Hence, the valid wheel speed VWV** should be appropriately updated as described above.

The CPU 51 determines whether the difference between the detected wheel speed and the maximum wheel speed VWMAX of the wheels 11FR, 11FL, 11RR, 11RL lies in the predetermined range KV3. Here, the CPU 51 is Central Processing Unit (CPU) provided at the electronic control unit 50 of the vehicle 10. However, an arithmetic circuit separately provided may be used as the CPU 51. The predetermined range KV3 is the allowable range to determine whether or not the wheel speed, which is used for updating the valid wheel speed VWV**, is detected with the desired accuracy.

When the determination made by the CUP 51 is positive, the CUP 51 also updates the valid wheel speed VWV of the wheel 11FR, 11FL, 11RR, 11RL based on the detected wheel speed of the wheel 11FR, 11FL, 11RR, 11RL when the detected wheel speed is lower than the predetermined valid wheel speed VWV which is currently stored. Here, the CPU 51 provided at the electronic control unit 50 of the vehicle 10 updates the valid wheel speed VWV, and is configured to be able to rewrite the content stored by the RAM 52. "When the determination made by the CUP 51 is positive" indicates that the difference between the detected wheel speed and the maximum wheel speed VWMAX of the wheels 11FR, 11FL, 11RR, 11RL lies in the predetermined range KV3. In such a case, the wheel speed, used for updating the valid vehicle speed VWV, is detected with the desired accuracy which is practically allowable. Then, the check is made to determine whether or not the valid wheel speed VWV should be updated based on the wheel speed detected with the desired accuracy. Specifically, when the detected wheel speed is smaller than the predetermined valid wheel speed VWV which is currently stored, the valid wheel speed VWV could be updated. Thus, the valid wheel speed VWV is updated based on the detected wheel speed of the wheel 11FR, 11FL, 11RR, 11RL.

Accordingly, in the vehicle control apparatus according to the embodiment, in case that the variations in the detected wheel speeds among the individual wheels 11FR, 11FL, 11RR, 11RL are large, for example when the vehicle 10 is running on the rough road, the updating process of the valid wheel speed VWV is not performed. Thus, the valid wheel speed VWV is updated with good accuracy. As a result, the vehicle speed is calculated based on the wheel speed, which is determined to be valid, and the vehicle control is performed in a suitable manner referring to the vehicle speed.

According to the embodiment of the vehicle control apparatus, the CPU 51 performs the filtering to remove the noise component from the detected wheel speed and also determines whether or not the difference between the wheel speed before the filtering and the maximum wheel speed VWMAX of the wheels 11FR, 11FL, 11RR, 11RL and the difference between the wheel speed after the filtering and the maximum wheel speed VWMAX of the wheels 11FR, 11FL, 11RR, 11RL lie in the predetermined range KV3.

According to the embodiment, the CPU 51 performs the filtering to remove the noise component from the wheel speed detected by the wheel speed sensors 41FR, 41FL, 41RR, and 41RL. Here, any one of a digital filter comprised of an electronic control device and an analog filter comprised of electronic components may be used. The filtering is performed by using a low pass filter to remove a frequency component, which is sufficiently higher compared to the changing frequency of the actual wheel speed, as the noise component.

Then, the CPU 51 determines whether or not the difference between the wheel speed before the filtering VX and the maximum wheel speed VWMAX of the wheels 11FR, 11FL, 11RR, 11RL and the difference between the wheel speed after the filtering VW and the maximum wheel speed VWMAX of the wheels 11FR, 11FL, 11RR, 11RL lie in the predetermined range KV3. If the determination is positive, it is assumed that the noise, which seriously affects, does not occur in the wheel speed to which the filtering is performed. Hence, the valid wheel speed VWV** is selectively updated only in the stable condition described above.

In the embodiment in which the filtering is performed, the CPU 51 updates the valid wheel speed VWV based on the wheel speed before the filtering VX or the wheel speed after the filtering VW, whichever is greater, when the wheel speed before the filtering VX and the wheel speed after the filtering VW are smaller than the predetermined valid wheel speed VWV, in case that the result determined by the CPU 51 is positive.

According to the embodiment, the valid vehicle speed VWV is updated based on the wheel speed before the filtering VX or the wheel speed after the filtering VW, whichever is greater. Thus, it is possible to avoid that the valid wheel speed VWV is updated with the wheel speed lower than the actual wheel speed, even when the wheel speed varies before and after the filtering.

According to another embodiment of the vehicle control apparatus, the CPU 51 determines whether or not any one of the detected wheel speeds exceeds the predetermined calculation allowable speed KV2.

According to the embodiment, the valid wheel speed VWV is not updated by the CPU 51 unless at least one wheel speed exceeds the predetermined calculation allowable speed KV2. Hence, it is possible to avoid that the valid vehicle speed VWV is updated, when the vehicle 10 is parked, or when the vehicle 10 runs at a speed lower than the detectable speed of the wheel speed sensors 41FR, 41FL, 41RR, 41RL and the like.

In the embodiment, the CPU 51 further detects the wheel acceleration DVW of the wheel subject to the updating process by differentiating the detected wheel speed VWV over time, and the CPU 51 further determines whether or not the detected wheel acceleration DVW** exceeds the predetermined calculation allowable acceleration KV2.

According to the embodiment, the valid wheel speed VWV is not updated by the CPU 51 unless the detected wheel acceleration DVW exceeds the predetermined calculation allowable acceleration such as 0 [G]. Therefore, in case that the vehicle 10 is being decelerated, in other words, in case that the wheel speed may be decreased to be lower than the detectable speed of each wheel speed sensor 41FR, 41FL, 41RR, 41RL in the near feature, it is possible to avoid that the valid wheel speed VWV** is updated.

The principles, of the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A vehicle control apparatus controlling a driving force or a braking force to be applied to a vehicle and conducting a vehicle control based on wheel speeds, comprising:
   a detecting means detecting the wheel speed of each wheel provided at the vehicle;
   a storing means storing a predetermined valid wheel speed for each wheel;
   a determining means determining whether a difference between the detected wheel speed and a maximum wheel speed of the wheel speeds lies in a predetermined range; and
   an updating means updating the valid wheel speed based on the detected wheel speed of the wheel, when a selected wheel speed of multiple wheels detected by the detecting means is smaller than the valid wheel speed currently stored by the storing means and when a result determined by the determining means is positive.

2. A vehicle control apparatus controlling a driving force or a braking force to be applied to a vehicle and conducting a vehicle control based on wheel speeds, comprising:
   a detecting means detecting the wheel speed of each wheel provided at the vehicle;
   a storing means storing a predetermined valid wheel speed for each wheel;
   a determining means determining whether a difference between the detected wheel speed and a maximum wheel speed of the wheel speeds lies in a predetermined range;
   an updating means updating the valid wheel speed based on the detected wheel speed of the wheel, when the detected wheel speed is lower than the predetermined valid wheel speed which is currently stored, in case that a result determined by the determining means is positive; and
   a filtering means performing filtering for the detected wheel speed to remove a noise component therefrom; and
   wherein the determining means determines whether or not a difference between the wheel speed before the filtering and the maximum wheel speed of the wheel speeds and a difference between the wheel speed after the filtering and the maximum wheel speed of the wheel speeds lie in the predetermined range.

3. A vehicle control apparatus according to claim 2, wherein the updating means updates the valid wheel speed based on the wheel speed before the filtering or the wheel speed after the filtering, whichever is greater, when the wheel speed before the filtering and the wheel speed after the filtering are smaller than the predetermined valid wheel speed, in case that a result determined by the determining means is positive.

4. A vehicle control apparatus according to claim 3, wherein the determining means further determines whether or not any one of the detected wheel speeds of the wheels exceeds a predetermined calculation allowable speed.

5. A vehicle control apparatus according to claim 4, further comprising:
   an acceleration detecting means detecting wheel acceleration of the wheel subject to the updating process performed by the updating means by differentiating the detected wheel speed over time,
   wherein the determining means further determines whether the detected wheel acceleration exceeds a predetermined calculation allowable acceleration.

6. A vehicle control apparatus according to claim 2, wherein the determining means further determines whether or not any one of the detected wheel speeds of the wheels exceeds a predetermined calculation allowable speed.

7. A vehicle control apparatus according to claim 6, further comprising:
   an acceleration detecting means detecting wheel acceleration of the wheel subject to the updating process performed by the updating means by differentiating the detected wheel speed over time,
   wherein the determining means further determines whether the detected wheel acceleration exceeds a predetermined calculation allowable acceleration.

8. A vehicle control apparatus according to claim 2, wherein the determining means further determines whether or not any one of the detected wheel speeds of the wheels exceeds a predetermined calculation allowable speed.

9. A vehicle control apparatus according to claim 8, further comprising:
   an acceleration detecting means detecting wheel acceleration of the wheel subject to the updating process performed by the updating means by differentiating the detected wheel speed over time,
   wherein the determining means further determines whether the detected wheel acceleration exceeds a predetermined calculation allowable acceleration.

10. A vehicle control apparatus according to claim 9, wherein the driving force or the braking force to be applied to the vehicle is controlled so that the vehicle speed calculated based on the updated wheel speed is maintained at a predefined target speed.

11. A vehicle control apparatus controlling a driving force or a braking force to be applied to a vehicle and conducting a vehicle control based on wheel speeds, comprising:
   detecting means for detecting the wheel speed of each wheel of the vehicle to obtain multiple wheels speeds;
   storing means for storing a predetermined valid wheel speed for each of the wheels;
   determining means for determining whether a difference between the detected wheel speed of a selected one of the wheels and a maximum wheel speed from amongst the multiple wheel speeds is in a predetermined range; and
   updating means for updating the valid wheel speed for the selected wheel which is currently stored in the storing means by replacing the currently stored valid wheel speed for the selected wheel with the detected wheel speed of the selected wheel when: i) the detected wheel speed of the selected wheel is smaller than the currently stored valid wheel speed for the selected wheel; and ii) the determining means determines that the difference between the detected wheel speed of the selected wheel and the maximum wheel speed is in the predetermined range.

* * * * *